Aug. 2, 1927.  
R. W. A. BREWER  
1,637,799  
CONSTRUCTION AND MOUNTING OF A VALVE SEALING MECHANISM FOR INTERNAL COMBUSTION ENGINES  
Filed March 9, 1925
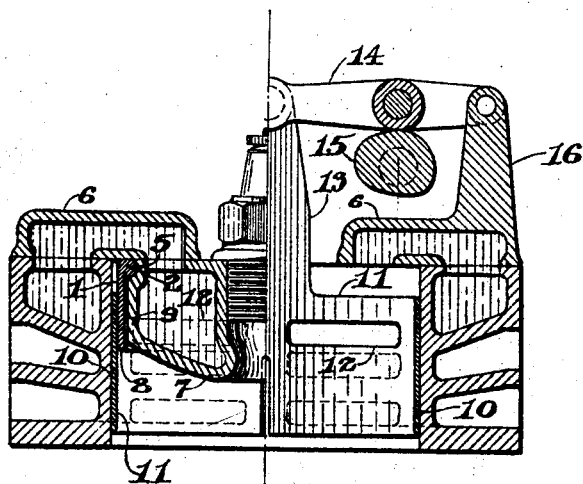
Fig. 2. ON LINE 2-2. FIG. 4.    Fig. 3. ON LINE 3-3. FIG. 4.
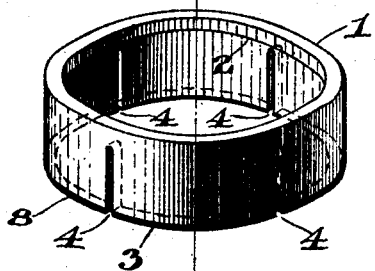
Fig. 1.
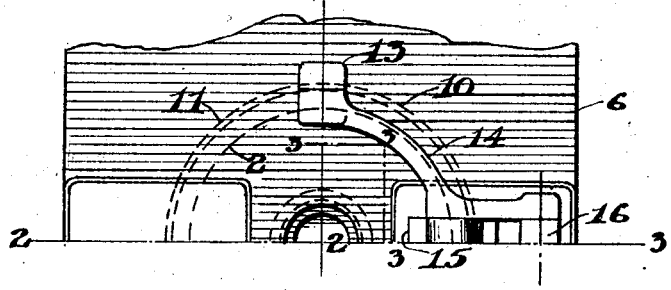
Fig. 4.
INVENTOR:  
Robert W. A. Brewer.  
BY  
ATTORNEYS.

Patented Aug. 2, 1927.

1,637,799

UNITED STATES PATENT OFFICE.

ROBERT W. A. BREWER, OF PHILADELPHIA, PENNSYLVANIA, ASSIGNOR TO HAROLD F. PITCAIRN, OF BRYN ATHYN, PENNSYLVANIA.

CONSTRUCTION AND MOUNTING OF A VALVE-SEALING MECHANISM FOR INTERNAL-COMBUSTION ENGINES.

Application filed March 9, 1925. Serial No. 13,993.

The main objects of this invention are to provide a simple and convenient means of preventing leakage of gases past a sleeve valve or similar mechanism, controlling the gas ports of an internal combustion engine, and particularly in constructions where the sleeve is contained in an annulus between the walls of a combustion chamber and a closure plug.

In the prior art, it has been customary to position one or more spring rings of the Ramsbottom type in grooves in the cylinder head closure plug. This arrangement necessitates the plug being of considerable length in order to accommodate such rings at the uppermost portion thereof in such a position that the ports in the valves do not overrun the rings in reciprocating throughout the full length of their travel. In those constructions where an operating port is retracted into the annulus, as for example, in certain of the constructions shown in contemporaneously pending patent applications filed by me, it may under certain conditions become difficult to prevent entirely the leakage of gases through a somewhat tortuous path from the combustion chamber to the atmosphere, by way of the clearance spaces between the valve and the annulus, by-passing through the valve port. The present invention provides a simple and practical means of interposing a wide and flexible ring or short sleeve between the valve closure plug and the sleeve in such a manner that a portion of said ring adapts itself flexibly under the action of pressure in the engine cylinder to close up existing clearance and thus prevent leakage. The action of this ring is somewhat similar to the actions of the slit, flexible valves shown in my contemporaneously pending patent specifications to which attention is directed.

The location of this fixed ring or short sleeve can conveniently be made by sliding the same axially over the closure plug from the outer end, making the shoulder of the ring fit up against an abutment on the closure plug and holding same in position by the cover plate of the mechanism or other suitable and convenient means. Mounting in this manner eliminates the necessity for completely splitting said cuff or ring and enables an assembly to be made without distorting the parts comprising the same. A convenient construction is effected by machining the sealing cuff or ring from a single piece of metal of which the thicker or upper part fits fairly snugly into a groove, the said groove having a suitable closure plate at the outer edge from which the assembly is made so that the ring fits fairly snugly against the same and makes a gas-tight joint. When pressure comes in the cylinder, the ring is pressed against this joint which forms an effective seal. The depending portion of the ring has a measure of flexibility afforded to it by means of a number of saw cuts, usually 4, which in assembled position are located midway on the face of the bars between the neighboring gas ports in the reciprocating valve. The ring or cuff may be prevented from rotation by any convenient means, for example a dowel or screw. I do not limit myself to the number of saw cuts or resulting flexible tongues of metal, nor do I hold as essential the prevention of rotation of the ring as this does not seriously influence the result obtained by this mechanism except in certain special cases where leakage might occur through ports in the ring should the saw cuts come opposite to them. I prefer to make the lower edge of the valve of sufficient length to extend slightly into the combustion chamber of the engine and to allow a small clearance between the cylinder closure plug and the flexible depending edge of the valve, so that gas under pressure can get behind this flexible portion and press the face of it against the walls of the combustion chamber where they pass into the annulus.

For the purpose of illustrating my invention, I have shown in the accompanying drawings forms thereof which are at present preferred by me, since they will give in practice satisfactory and reliable results although it is to be understood that the various instrumentalities of which my invention consists can be variously arranged and organized and that my invention is not limited to the precise arrangement and organization of these instrumentalities as herein shown and described.

Referring now to the drawings:

Figure 1 is a perspective view of the ring.

Figure 2 is a section on line 2—2 of Fig. 4.

Figure 3 is a section on line 3—3 of Fig. 4 with the closure plug removed.

Figure 4 is a plan showing the general arrangement of the parts.

Similar numbers refer to similar parts on all drawings.

The perspective view, Fig. 1, shows a ring 1, comprising an upper retaining edge 2, of somewhat thicker section than the other parts of the ring and generally of the form usually employed as a packing ring and preferably made in a continuous circle. Depending from said edge 2 is a skirt 3, of comparatively thin section and having a plurality of slits 4 cut therein from the bottom upwardly, thus rendering the skirt locally flexible and giving it the characteristic of a series of pendant flexible tongue pieces. The thicker section or annular inner shoulder 2, of the ring 1, is held in a groove or seat 5, in the closure plug 7, this groove preferably being at the top of the plug as shown in Fig. 2 as this construction permits the ring or fixed sleeve to be placed upon the plug 7 in a convenient manner and being retained in position by the cover plate 6, which makes close contact with the upper part of the retaining edge 2 so that a gas-tight joint is made between the two surfaces in contact. The skirt 3 can conveniently be made slightly longer than the annular space so that there is a protruding bottom terminal portion 8, below the edge of the annulus, which portion 8 can conveniently be slightly relieved or rounded on its outward circumference as seen in Fig. 2 so that the port 12 in the valve 11, passes easily over this edge as it reciprocates under working conditions. The dimensions of the assembled parts can conveniently be correlated, so that there is a small clearance space 9 at the back of the skirt 3, allowing high pressure gases to enter this space and force the flexible tongue-like pieces of the skirt 3 into close contact with the inner walls of the sleeve valve 11, thus sealing the inner wall of the said valve to the outer wall of the sealing ring. Simultaneously, the internal pressure forces the entire ring element 1 upwards against the bottom of the cover plate 6, pressing the juxtaposed surfaces into close contact and effectually sealing them against pressure leakage. In the construction shown, for the purpose of illustration, two rings of ports are formed in the wall of the head 10, the general arrangement being similar to that described in a contemporaneously pending application covering the construction of the valve in actuating ports of this type. For the purpose of clearly bringing out the functions of my novel mechanism, I show the valve 11, which is preferably of the split skirt type, as being provided with a series of ports 12, which control the gas flow and having operating lugs 13 attached thereto, these lugs in turn being connected to levers 14 pivoted to a suitable bracket 16, the motion being imparted to the lever 14, by the cam 15, which in the example shown operates both to raise and lower the valve 11, from the normal closed position. As shown in the drawing, the valve is closed as in position of firing in an internal combustion engine and it will be seen that it is stationary under these conditions and remains so until the time of exhaust opening. During this time the pressure of the gases in the combustion chamber of the engine forces the flexible portion 3 of the sealing ring closely against the port openings 12 of the valve, which openings are retracted into the annular space; leakage of gases is therefore prevented from taking place through these port openings 12 to the gas passages through the wall of the head 10, nor can the gases leak upwards into the atmosphere on account of the closeness of fit between the upper part of the ring 2 and the cover plate 6. From the foregoing, it will be seen that my invention completely fulfills the purposes set forth, namely, prevention of leakage of gases around the sleeves of a valve of this type and that the single, wide, flexible ring hereinbefore described, is more efficacious than the multiplicity of narrow or slotted rings heretofore used in the prior art, said ring being obviously simple to assemble and does not have to be distorted in process of mounting.

It will now be apparent that I have devised a novel and useful construction and mounting of a valve sealing mechanism for internal combustion engines which embodies the features of advantage enumerated as desirable in statement of the invention and the above description, and while I have, in the present instance, shown and described preferred embodiments thereof which will give in practice satisfactory and reliable results, it is to be understood that the same are susceptible of modification in various particulars without departing from the spirit or scope of the invention or sacrificing any of its advantages.

Having thus described my invention what I claim as new and desire to secure by Letters Patent, is:—

1. In an internal combustion engine, a cylinder, a combustion chamber, a cylinder head closure plug having an annular seat thereon, slide valve, an annulus between the closure plug and the walls of the combustion chamber in which said valve is positioned, and a short stationary sleeve adapted to be carried on the annular seat of said closure plug and depending in said annulus with a surface juxtaposed to that of said sleeve valve, said depending portion consisting of a skirt having limited flexibility, having a small clearance of the back thereof between the closure plug and said depending portion.

2. In an internal combustion engine, a cylinder, a combustion chamber, a cylinder head closure plug having an annular seat thereon, a slide valve, an annulus between said closure plug and the walls of said combustion chamber, a short stationary sleeve carried on the annular seat of said closure plug and depending in said annulus with a surface juxtaposed to that of said sleeve valve, said depending portion consisting of a skirt having limited flexibility controlled by cuts therein disposed in an axial direction and having a small clearance at the back thereof between the closure plug and said portion.

3. In an internal combustion engine, a cylinder, a combustion chamber, a cylinder head closure plug having an annular seat thereon, an annulus between said plug and the walls of said combustion chamber, a sleeve valve positioned in said annulus, and a fixed sleeve having an inner upper shoulder supported on said seat, said sleeve being provided with resilient pendant tongues positioned between said plug and the inner periphery of said valve.

ROBERT W. A. BREWER.